US008976400B2

(12) United States Patent
Stokes et al.

(10) Patent No.: US 8,976,400 B2
(45) Date of Patent: Mar. 10, 2015

(54) METHOD, NETWORK DEVICE, AND SYSTEMS FOR REQUESTING, SCANNING, AND RECEIVING A DOCUMENT AS AN IMAGE FILE VIA A CLOUD

(71) Applicant: Marvell World Trade LTD., St. Michael (BB)

(72) Inventors: DeVerl Stokes, Eagle, ID (US); Eric J. Luttmann, Eagle, ID (US); Gary D. Zimmerman, Garden Valley, ID (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/279,921

(22) Filed: May 16, 2014

(65) Prior Publication Data

US 2014/0247471 A1 Sep. 4, 2014

Related U.S. Application Data

(63) Continuation of application No. 13/249,786, filed on Sep. 30, 2011, now Pat. No. 8,730,504.

(60) Provisional application No. 61/405,058, filed on Oct. 20, 2010.

(51) Int. Cl.
*H04N 1/04* (2006.01)
*G06F 3/12* (2006.01)
*H04N 1/00* (2006.01)
*H04N 1/32* (2006.01)
*H04N 1/21* (2006.01)

(52) U.S. Cl.
CPC ....... *H04N 1/00103* (2013.01); *H04N 1/00222* (2013.01); *H04N 1/00225* (2013.01); *H04N 1/32432* (2013.01); *H04N 1/2166* (2013.01);
CPC .......... *H04N 2201/0039* (2013.01); *H04N 2201/0075* (2013.01)
USPC ......................................... 358/1.15; 358/474

(58) Field of Classification Search
CPC .......... H04N 1/00222; H04N 1/00225; H04N 1/32432; H04N 2201/0039; H04N 2201/0075
USPC ................................. 358/1.1–1.9, 1.11–1.18
See application file for complete search history.

(56) References Cited

U.S. PATENT DOCUMENTS

| 8,441,672 | B2 | 5/2013 | Ohishi et al. |
| 2003/0050971 | A1* | 3/2003 | Okuyama et al. ............. 709/203 |
| 2007/0002391 | A1* | 1/2007 | Nagarajan et al. ....... 358/426.07 |
| 2008/0027949 | A1* | 1/2008 | Kawada .......................... 707/10 |
| 2008/0079985 | A1 | 4/2008 | Ferlitsch |
| 2010/0005136 | A1* | 1/2010 | Ferlitsch et al. .............. 709/203 |
| 2010/0027057 | A1 | 2/2010 | Fujisawa |

FOREIGN PATENT DOCUMENTS

EP 1416709 6/2004

OTHER PUBLICATIONS

PCT International Search Report and Written Opinion; Apr. 23, 2013.

* cited by examiner

*Primary Examiner* — King Poon
*Assistant Examiner* — Ibrahim Siddo (57) ABSTRACT

A network device including a controller, a transmitter and a receiver. The controller is configured to generate a first request that initiates, via a cloud, scanning of a document via a scanner. The cloud includes a service device, and a document device that is separate from the document device. The transmitter is configured to, prior to the scanner scanning the document, transmit the first request from the network device to the service device. The receiver is configured to, based on the first request received at the service device and subsequent to the scanner scanning the document, receive an image file transmitted from the document device to the network device without prior transmission of the image file from the document device to the service device. The image file includes an image of the document.

16 Claims, 7 Drawing Sheets

METHOD, NETWORK DEVICE, AND SYSTEMS FOR REQUESTING, SCANNING, AND RECEIVING A DOCUMENT AS AN IMAGE FILE VIA A CLOUD

CROSS-REFERENCE TO RELATED APPLICATIONS

The present disclosure is a continuation of U.S. patent application Ser. No. 13/249,786 (now U.S. Pat. No. 8,730, 504), filed on Sep. 30, 2011. This application claims the benefit of U.S. Provisional Application No. 61/405,058, filed on Oct. 20, 2010. The entire disclosures of the applications referenced above are incorporated herein by reference.

FIELD

The present disclosure relates generally to the field of acquisition of electronic images of documents, photos, and the like. More particularly, the present disclosure relates to acquisition of such images using cloud services.

BACKGROUND

Many new computing paradigms rely on cloud computing, that is, using on-demand computer resources and services that are provided over a computer network rather than by a locally-connected device. Cloud services can be completely offsite, or in some cases, can be provided by local computing or peripheral devices.

Solutions have been devised for cloud-based file storage, document creation and editing, application execution, and even printing. However, cloud-based services have not yet been extended to the field of image acquisition, for example for scanning documents, photos, and the like.

SUMMARY

A network device is provided and includes a controller, a transmitter, and a receiver. The controller is configured to generate a first request. The first request initiates, via a cloud, scanning of a document via a scanner. The cloud comprises a service device and a document device. The service device is separate from the document device. The transmitter is configured to, prior to the scanner scanning the document, transmit the first request from the network device to the service device. The receiver is configured to, based on the first request received at the service device and subsequent to the scanner scanning the document, receive an image file transmitted from the document device to the network device without prior transmission of the image file from the document device to the service device, wherein the image file includes an image of the document.

A method for receiving an image file from a cloud at a network device is provided. The cloud includes a service device and a document device. The service device is separate from the document device. The method includes: generating a first request at the network device, where the first request initiates, via the cloud, scanning of a document via a scanner; prior to the scanner scanning the document, transmitting, via a transmitter, the first request from the network device to the service device; and based on the first request received at the service device and subsequent to the scanner scanning the document, receiving, via a receiver, the image file transmitted from the document device to the network device without prior transmission of the image file from the document device to the service device. The image file includes an image of the document.

A system is provided and includes a service device and a document device. The service device is implemented in a cloud. The service device is configured to receive a first request from a network device. The first request initiates, via the cloud, scanning of a document via a scanner. The service device is configured to receive the first request prior to the scanner scanning the document. The document device implemented in the cloud. The document device is separate from the service device. The document device is configured to, based on the first request received at the service device, (i) receive an image file generated as a result of the scanner scanning the document, and (ii) transmit the image file to the network device without previously transmitting the image file to the service device. The image file includes an image of the document.

In general, in one aspect, an embodiment features an apparatus including: a controller configured to generate a cloud scan request, where the cloud scan request represents a request to scan a document using cloud services; a transmitter configured to transmit the cloud scan request to a cloud print service; and a receiver configured to receive an image file from a cloud document service, where the file includes an image of the document.

In general, in one aspect, an embodiment features a method including: generating a cloud scan request responsive to a user request, where the cloud scan request represents a request to scan a document using cloud services; transmitting the cloud scan request to a cloud print service; and receiving an image file from a cloud document service, where the image file includes an image of the document.

In general, in one aspect, an embodiment features computer-readable media embodying instructions executable by a computer to perform functions including: generating a cloud scan request responsive to a user request, where the cloud scan request represents a request to scan a document using cloud services; transmitting the cloud scan request to a cloud print service; and receiving an image file from a cloud document service, where the image file includes a scan of the document.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

Embodiments of the present disclosure provide cloud scanning, that is, the utilization of cloud services to facilitate acquisition of an electronic image of a document. As used herein, the term "document" is used to refer to any item that can be scanned by a scanner. Cloud scanning allows scanning from any resource connected to the cloud, including local resources such as a local office scanner, as well as remote resources such as a user's home scanner while the user is traveling on another continent.

Figure 1:
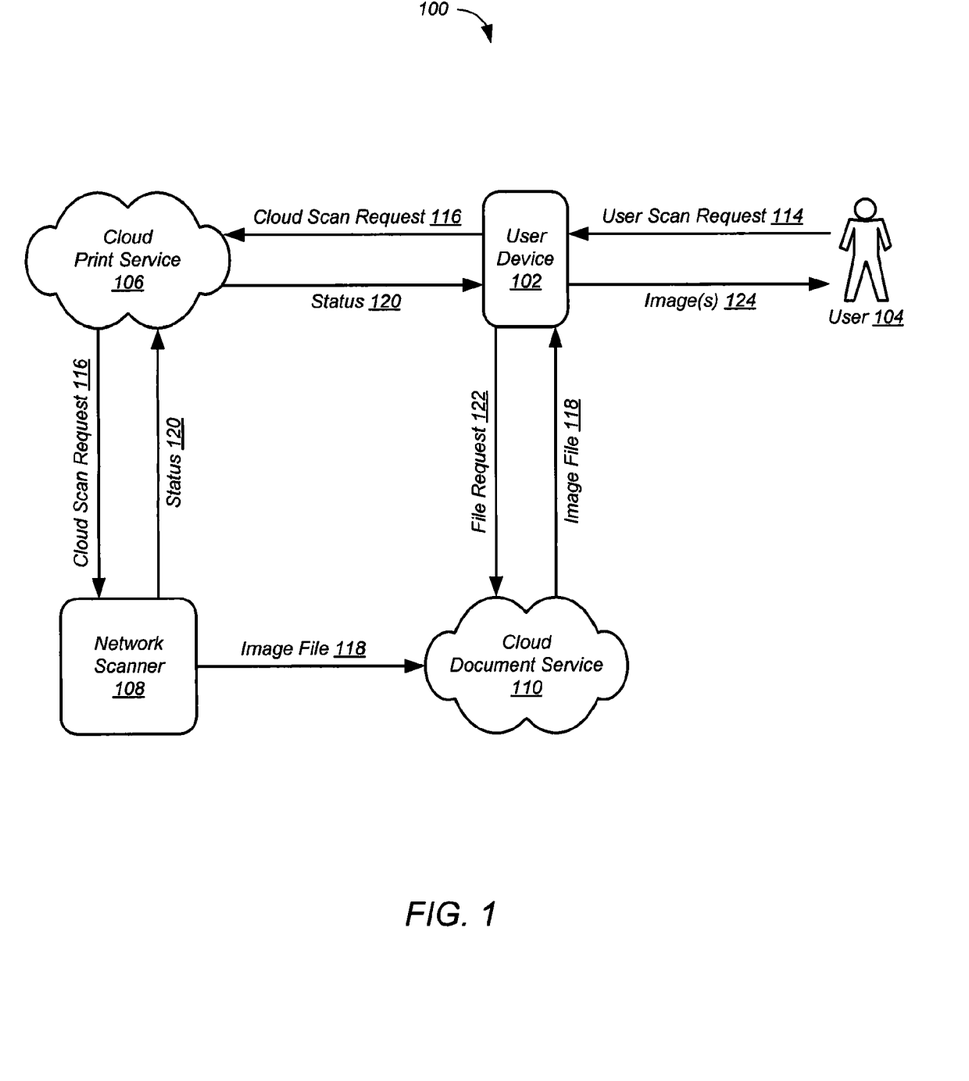
FIG. 1 shows elements of a cloud scanning system that includes a network scanner according to one embodiment.

FIG. 1 shows elements of a cloud scanning system 100 that includes a network scanner according to one embodiment. Referring to FIG. 1, cloud scanning system 100 includes a user device 102 operated by a user 104, a cloud print service 106, a network scanner 108, and a cloud document service 110. User device 102 can be any device capable of the respective functions described herein, for example such as a computer, smartphone, and the like. A cloud print service is a service that enables an application on a device in a network cloud to print to a printer in the network cloud. Cloud print service 106 can be any cloud print service capable of the respective functions described herein, for example such as the Google Cloud Print service and the like. Network scanner 108 can be any device capable of the respective functions described herein, for example such as commercially-available network scanners, multi-function network printers, and the like. A cloud document service is a service that enables an application on a device in a network cloud to transfer files such as document files to and from a storage device in the network cloud. Cloud document service 110 can be any cloud document service capable of the respective functions described herein, for example such as such as the Google Docs service and the like. The elements of cloud scanning system 100 can communicate by any means, for example including networks such as the Internet and the like.

Figure 2:
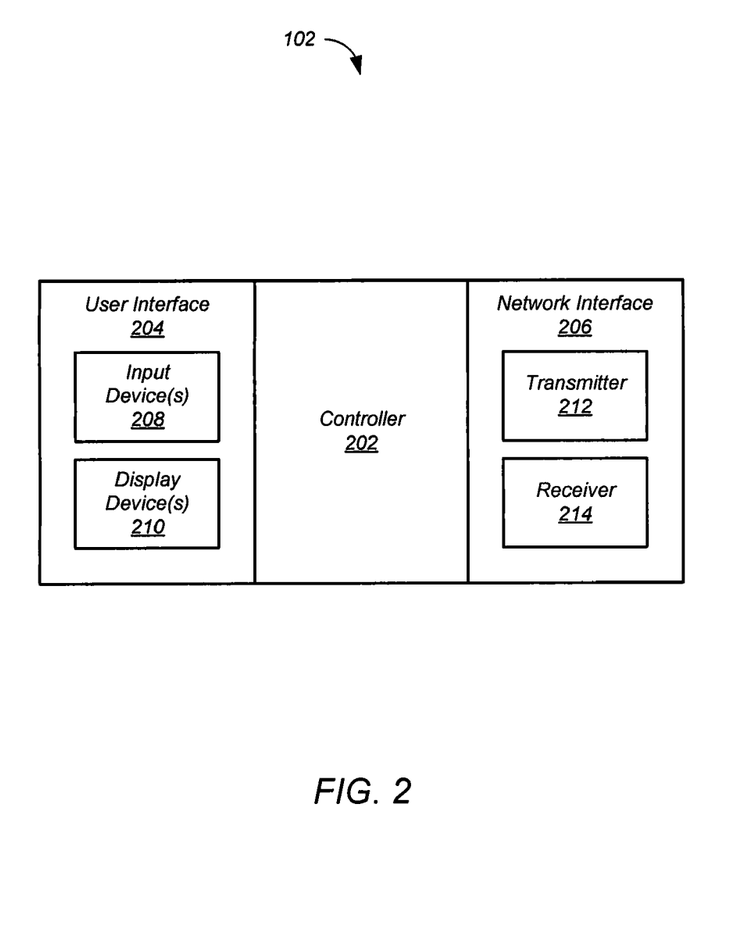
FIG. 2 shows elements of a user device according to one embodiment.

FIG. 2 shows elements of a user device 102 according to one embodiment. Referring to FIG. 2, user device 102 includes a controller 202, a user interface 204, and a network interface 206. Controller 202 can be implemented as a processor or the like. User interface 204 includes one or more input devices 208 such as touchscreens, trackballs, mice, rocker switches, buttons, and the like, and one or more display devices 210 such as screens, touchscreens, projectors and the like. Network interface 206 includes a transmitter 212 and a receiver 214. Network interface 206 can be wired, wireless, optical, or the like. In the case of a wireless network, network interface 206 can be compliant with all or part of IEEE standard 802.11, including draft and approved amendments such as 802.11a, 802.11b, 802.11e, 802.11g, 802.11i, 802.11k, 802.11n, 802.11v, 802.11w, and 802.11z.

Now an example cloud scanning operation for cloud scanning system 100 of FIG. 1 is described according to one embodiment. User 104 employs user device 102 to send a cloud scan request 112 to cloud print service 106. In particular, user 104 employs input device(s) 208 to input a user scan request 114 to user device 102. In response, controller 202 generates a cloud scan request 116, and transmitter 212 transmits request 116 to cloud print service 106. In response, cloud print service 106 forwards request 116 to network scanner 108.

Figure 3:
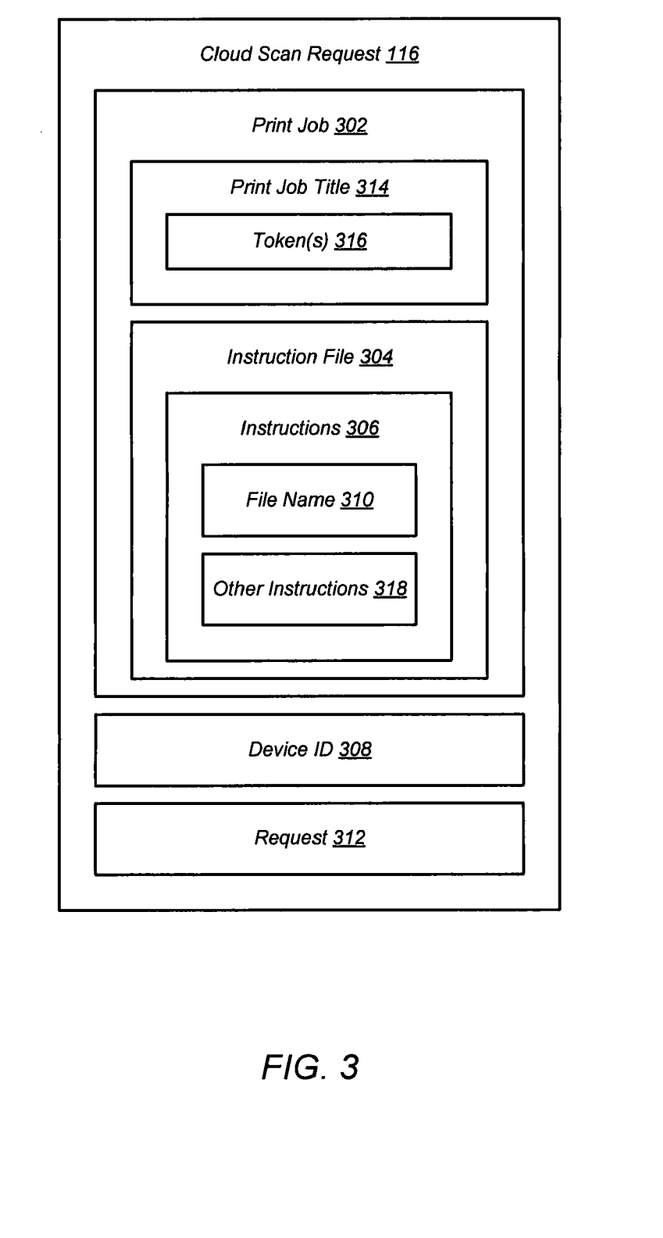
FIG. 3 shows elements of a cloud scan request according to one embodiment.

FIG. 3 shows elements of a cloud scan request 116 according to one embodiment. Referring to FIG. 3, cloud scan request 116 includes a print job 302, a device ID 308 that identifies network scanner 108, and a request 312 to transmit the resulting image file 118 to cloud document service 110. Print job 302 includes a print job title 314 and an instruction file 304 containing instructions 306 for scanning one or more documents. Instructions 306 include a file name 310 to be assigned to resulting image file 118, as well as other scanning instructions 318 such as the desired scan resolution, the color mode, and the like. Print job title 314 includes one or more tokens 316 that indicate print job 302 is actually a scan job 302. Device ID 308 can include a network address or the like for network scanner 108.

Figure 4:
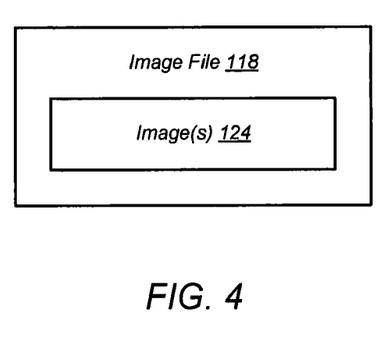
FIG. 4 shows detail of an image file according to one embodiment.

FIG. 4 shows detail of image file 118 according to one embodiment. Referring to FIG. 4, image file 118 includes one or more images 124 of the scanned document. Images 124 can be in any format. The format of images 124 can be specified by cloud scan request 116.

Referring again to FIG. 1, in response to cloud scan request 116, network scanner 108 scans one or more documents and transmits the resulting image file 118 to cloud document service 110. Network scanner 108 also provides status 120 of the scan job 302 to cloud print service 106, which forwards status 120 to user device 102. Referring to FIG. 2, receiver 214 of network interface 206 receives status 120. When status 120 indicates scan job 302 is done, user device 102 issues a file request 122 to cloud document service 110. In particular, controller 202 generates file request 122, for example in response to input from user 104, and transmitter 212 transmits request 122 to cloud document service 110.

Figure 5:
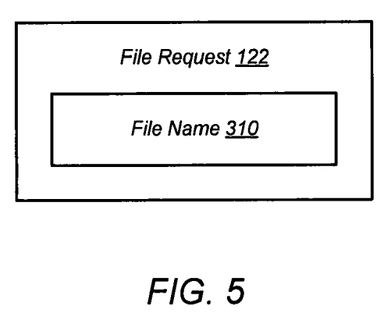
FIG. 5 shows elements of a file request according to one embodiment.

FIG. 5 shows elements of a file request 122 according to one embodiment. Referring to FIG. 5, file request 122 includes the same file name 310 used in cloud scan request 116. Referring again to FIG. 1, in response to file request 122, cloud document service 110 transmits image file 118 to user device 102, which can display image(s) 124 to user 104. In particular, receiver 214 of network interface 206 receives image file 118, and display device(s) 210 display image(s) 124 to user 104.

Figure 6:
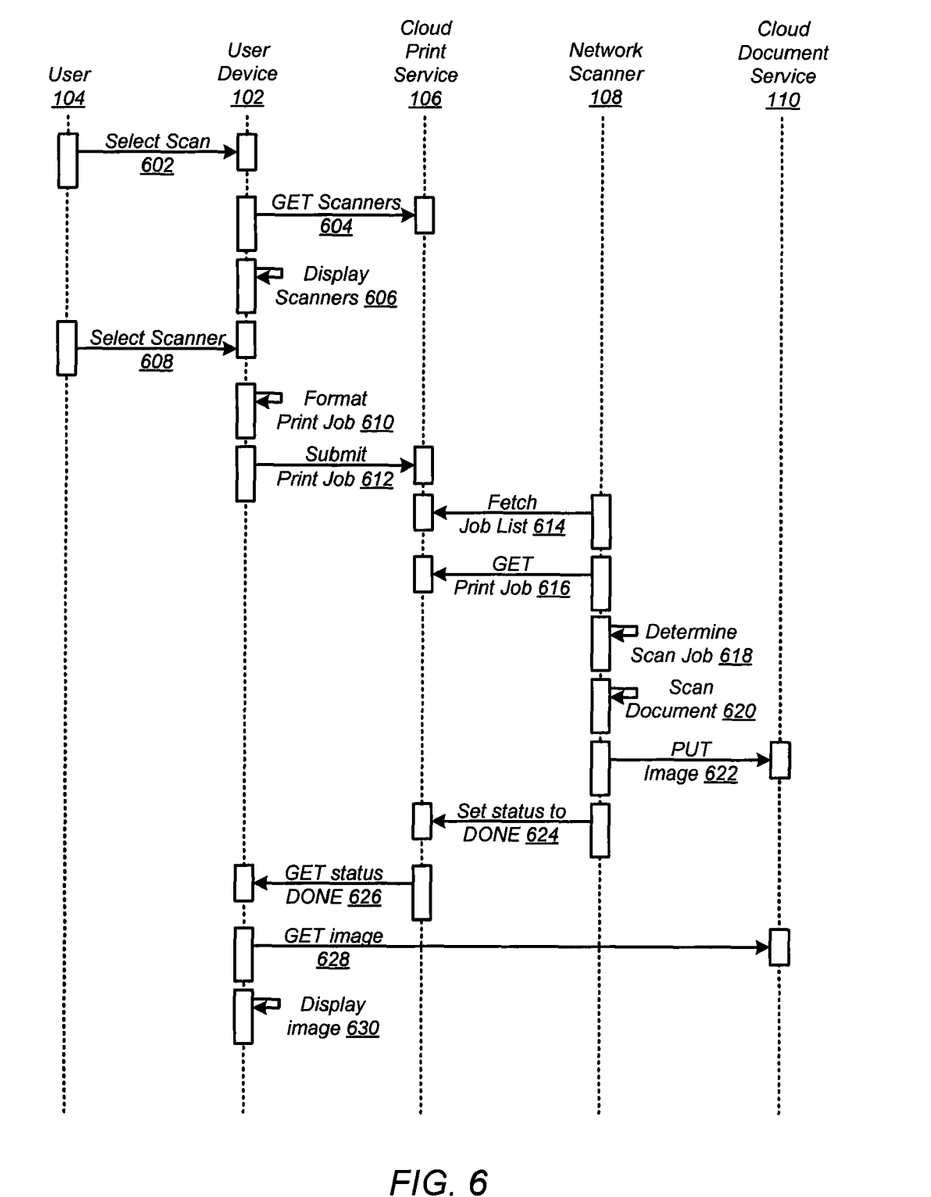
FIG. 6 shows a process for the cloud scanning system of FIG. 1 according to one embodiment.

FIG. 6 shows a process for cloud scanning system 100 of FIG. 1 according to one embodiment. Although in the described embodiments the elements of the process are presented in one arrangement, other embodiments may feature other arrangements. For example, in various embodiments, some or all of the elements of the process can be executed in a different order, concurrently, and the like.

Referring to FIG. 6, user 104 employs user device 102 to select a scan operation at 602. In response, an application executing on controller 202 of user device 102 gets a list of available scanners 108 registered for user 104 from cloud print service 106 at 604. The application determines which of the scanners 108 are capable of scanning, and displays a list of those scanners 108 to user 104 at 606. User 104 employs user device 102 to select a network scanner 108 from the list at 608. In response, user device 102 formats print job 302 at 610, and submits print job 302 to cloud print service 106 at 612.

Network scanner 108 polls for new print jobs 302 by fetching a list of print jobs 302 from cloud print service 106 at 614. When the list includes a new print job 302 for network scanner 108, network scanner 108 gets the new print job 302 from cloud print service 106 at 616. At 618, network scanner 108 determines that the print job 302 is a scan job 302 using the token(s) 316 in the print job title 314. Network scanner 108 scans the document according to instructions 306 at 620, places the resulting image(s) 124 in an image file 118, assigns file name 310 to the image file 118, and sends the image file 118 to cloud document service 110 at 622. At 624 network scanner 108 sends status 120 to cloud print service 106 indicating that the scan job 302 is done.

User device 102 polls cloud print service 106 to obtain status 120. In response to the status 120 indicating that the scan job 302 is done, user device 102 gets image file 118 from cloud document service 110 using file name 310 at 628, and displays image(s) 124 to user 104 at 630.

Figure 7:
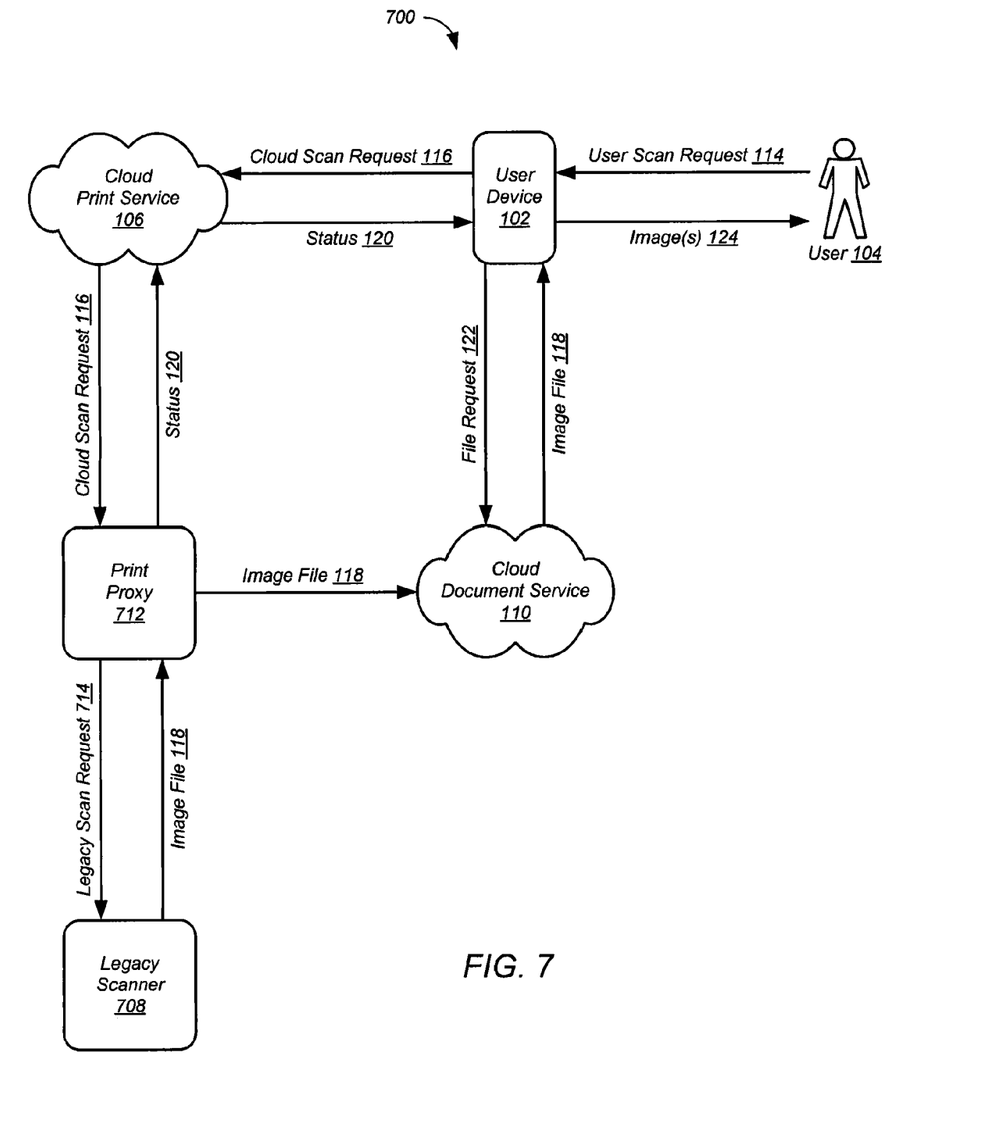
FIG. 7 shows elements of a cloud scanning system that includes a legacy scanner and print proxy according to one embodiment.

FIG. 7 shows elements of a cloud scanning system 700 that includes a legacy scanner and print proxy according to one embodiment. Referring to FIG. 7, cloud scanning system 700 includes a legacy scanner 708 and a print proxy 712. A legacy scanner 708 is a scanner that requires a print proxy 712 to operate with a network. A print proxy 712 is a software component, running on local computing resources, that enables legacy scanners, printers, multi-function printers, and the like, to operate with a network. Legacy scanner 708 can be any device capable of the respective functions described herein, for example such as commercially-available scanners, multi-function printers, and the like. The remaining elements of cloud scanning system 700, namely user device 102, cloud print service 106, and cloud document service 110, can be implemented and operated as described above.

Now an example cloud scanning operation for cloud scanning system 700 of FIG. 7 is described according to one embodiment. User 104 employs user device 102 to send a cloud scan request 112 to cloud print service 106. In particular, user 104 employs input device(s) 208 to input a user scan request 114 to user device 102. In response, controller 202 generates a cloud scan request 116, and transmitter 212 transmits request 116 to cloud print service 106. In response, cloud print service 106 forwards request 116 to print proxy 712. Print proxy generates a legacy scan request 714 responsive to cloud scan request 116, and sends request 714 to legacy scanner 708. Legacy scan request 714 can be implemented as a conventional scan request such as a scan request sent by a personal computer to a local scanner or the like.

In response to legacy scan request 714, legacy scanner 708 scans the one or more documents and transmits the resulting image file 118 to print proxy 712, which forwards image file 118 to cloud document service 110. Print proxy 712 also provides status 120 of the scan job 302 to cloud print service 106, which forwards status 120 to user device 102. Referring to FIG. 2, receiver 214 of network interface 206 receives status 120. When status 120 indicates the scan job 302 is done, user device 102 issues a file request 122 to cloud document service 110. In particular, controller 202 generates file request 122, for example in response to input from user 104, and transmitter 212 transmits request 122 to cloud document service 110.

Figure 8:
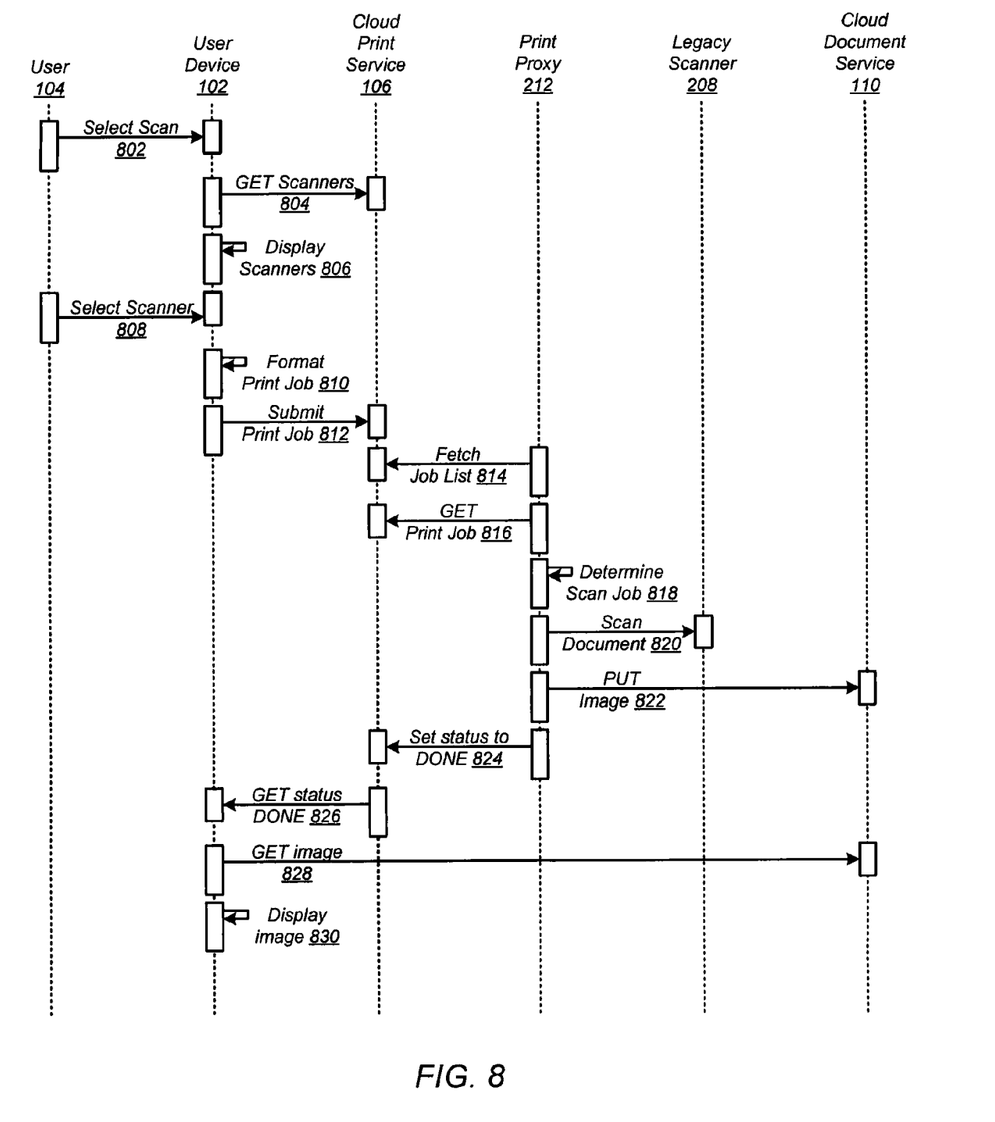
FIG. 8 shows a process for the cloud scanning system of FIG. 7 according to one embodiment.

FIG. 8 shows a process for cloud scanning system 700 of FIG. 7 according to one embodiment. Although in the described embodiments the elements of the process are presented in one arrangement, other embodiments may feature other arrangements. For example, in various embodiments, some or all of the elements of the process can be executed in a different order, concurrently, and the like.

Referring to FIG. 8, user 104 employs user device 102 to select a scan operation at 802. In response, an application executing on controller 202 of user device 102 gets a list of available scanners 108 registered for user 104 from cloud print service 106 at 804. The application determines which of the scanners 108 are capable of scanning, and displays a list of those scanners 108 to user 104 at 806. In this embodiment, the list includes at least one legacy scanner 708 and print proxy 712. User 104 employs user device 102 to select a legacy scanner 708 from the list at 808. In response, user device 102 formats print job 302 at 810, and submits print job 302 to cloud print service 106 at 812.

Print proxy 712 polls for new print jobs 302 by fetching a list of print jobs 302 from cloud print service 106 at 814. When the list includes a new print job 302 for legacy scanner 708, print proxy 712 gets the new print job 302 from cloud print service 106 at 816. At 818, print proxy 712 determines that the print job 302 is a scan job 302 using the token(s) 316 in the print job title 314. Print proxy 712 then causes legacy scanner 708 to scan the document according to instructions 306 at 820, places the resulting image(s) 124 in an image file 118, assigns file name 310 to the image file 118, and sends the image file 118 to cloud document service 110 at 822. At 824 print proxy 712 sends a status 120 to cloud print service 106 indicating that the scan job 302 is done.

User device 102 polls cloud print service 106 to obtain status 120. In response to the status 120 indicating that the scan job 302 is done, user device 102 gets image file 118 from cloud document service 110 using file name 310 at 828, and displays image(s) 124 to user 104 at 830.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, various modifications may be made without departing from the scope of the disclosure. Accordingly, other implementations are within the scope of the following claims.

What is claimed is:

1. A system comprising:
  a service device;
  a document device;
  a network device comprising
    a controller configured to generate a first request, wherein the first request initiates, via a cloud, scanning of a document via a scanner, wherein the cloud comprises the service device and the document device, wherein the service device is separate from the document device, wherein the first request includes a file name, and wherein the file name is assigned to an image file,
   a transmitter configured to (i) prior to the scanner scanning the document, transmit the first request from the network device to the service device, and (ii) poll the service device to obtain a status update for the first request, and
   a receiver; and
a print device separate from the service device and the scanner,
wherein
   the service device is configured to (i) select the scanner, and (ii) in response to the first request, send a second request to the print device, wherein the second request requests scanning of the document by the scanner,
   the print device is configured to generate a third request in response to the second request, wherein the third request requests scanning of the document by the scanner,
   the receiver is configured to, based on the first request received at the service device and subsequent to the scanner scanning the document, receive an image file transmitted from the document device to the network device without prior transmission of the image file from the document device to the service device, wherein the image file includes an image of the document,
   the receiver is configured to, based on the first request received at the service device and subsequent to the scanner scanning the document, receive the status update from the service device, wherein the status update indicates the scanning of the document is completed, and
   the transmitter is configured to, subsequent to the receiver receiving the status update, transmit a fourth request to the document device, wherein the fourth request requests the image file by the file name.

2. The system of claim 1, wherein the controller is configured to:
   select the scanner, wherein the scanner is connected to the service device;
   transmit, via the service device, the first request to the scanner or the print device; and
   the print device is separate from and connected to the scanner.

3. The system of claim 1, wherein:
   the first request includes a token and an instruction file;
   the token indicates the first request is a scan job; and
   the instruction file includes instructions for scanning the document.

4. The system of claim 1, wherein the second request requests for the image file to be transmitted from the document device to the network device.

5. The system of claim 1, further comprising the scanner.

6. The system of claim 5, wherein:
   the service device is separate from the scanner; and
   the document device is separate from the scanner.

7. The system of claim 5, wherein the service device is configured to, based on the first request, enable an application on the scanner to print.

8. The system of claim 5, wherein:
   the document device is configured to enable an application to transfer files, including the image file, to and from a storage device; and
   the storage device is in the cloud.

9. The system of claim 5, wherein the scanner is configured to scan the document in response to the fourth request.

10. A method for receiving an image file from a cloud at a network device, wherein the cloud includes a service device and a document device, and wherein the service device is separate from the document device, the method comprising:
   generating a first request at the network device, wherein the first request initiates, via the cloud, scanning of a document via a scanner;
   prior to the scanner scanning the document, transmitting, via a transmitter, the first request from the network device to the service device;
   based on the first request, generating a job list via the service device;
   at a print device, receiving the job list and identifying the first request as a new scan job, wherein the print device is separate from the service device, the scanner, and the document device:
   transmitting a scan signal from the print device to the scanner to scan the document, wherein the scan signal requests scanning of the document;
   subsequent to the document being scanned by the scanner, receiving the image file from the scanner at the print device;
   subsequent to the image file being forwarded to the print device, forwarding the image file from the print device to the document device;
   based on the first request received at the service device and subsequent to the scanner scanning the document, receiving, via a receiver, the image file transmitted from the document device to the network device without prior transmission of the image file from the document device to the service device, wherein the image file includes an image of the document;
   transmitting a first status signal from the print device to the service device indicating the scanning of the document is complete;
   in response to the first status signal, transmitting a second status signal from the service device to the network device indicating the scanning of the document is complete; and
   in response to the second status signal, transmitting a file name for the image file from the network device to the document device to request transfer of the image from the document device to the network device.

11. The method of claim 10, further comprising:
   polling the service device to obtain a status update for the first request at the network device, wherein the first request includes the file name, wherein the file name is assigned to the image file, and wherein the second status signal includes the status update;
   based on the first request received at the service device and subsequent to the scanner scanning the document, receiving the status update from the service device at the network device, wherein the status update indicates the scanning of the document is completed; and
   subsequent to the receiver receiving the status update, transmitting a second request to the document device, wherein the second request requests the image file by the file name.

12. The method of claim 10, further comprising transmitting a file request from the network device to the document device, wherein:
   the first request includes (i) the file name for the image file, and (ii) a second request to transmit the image file to the document device; and the file request includes (i) the file name for the image file, and (ii) a third request to send the image file to the network device.

13. A system comprising:

a service device implemented in a cloud, wherein the service device is configured to receive a first request from a network device, wherein the first request initiates, via the cloud, scanning of a document via a scanner, and wherein the service device is configured to (i) receive the first request prior to the scanner scanning the document, and (ii) based on the first request, generate a job list;

a print device configured to
receive the job list,
identify the first request as a new scan job,
transmit a scan signal from the print device to the scanner, wherein the scan signal requests scanning of the document, and
subsequent to the document being scanned by the scanner, (i) receiving an image file from the scanner as a result of the scanner scanning the document, and (ii) transmitting a first status signal from the print device to the service device indicating the scanning of the document is complete; and a document device implemented in the cloud, wherein the document device is separate from the service device, and wherein the document device is configured to, based on the first request received at the service device, (i) subsequent to the image file being forwarded to the print device, receive the image file from the print device, and (ii) transmit the image file to the network device without previously transmitting the image file to the service device, wherein the image file includes an image of the document, wherein
the print device is separate from the service device, the scanner, and the document device,
the service device is configured to, in response to the first status signal, transmit a second status signal from the service device to the network device indicating the scanning of the document is complete, and
the document device is configured to, based on the second status signal, receive a file name for the image file from the network device, and wherein the second status signal requests transfer of the image from the document device to the network device.

14. The system of claim 13, wherein:
the first request includes the file name;
the file name is assigned to the image file;
the service device is configured to, based on the first request, subsequent to the scanner scanning the document, and in response to being polled by the network device, transmit a status update for the first request to the network device, wherein the second status signal includes the status update;
the status update indicates the scanning of the document is completed;
the document device is configured to, subsequent to the service device transmitting the status update to the network device, receive a second request from the network device; and
the second request requests the image file by the file name.

15. The system of claim 14, further comprising the scanner, wherein the scanner is configured to, based on the first request, (i) scan the document to generate the image file, and (ii) assign the file name to the image file.

16. The system of claim 13, wherein:
the service device is separate from the scanner; and
the document device is separate from the scanner.

* * * * *